United States Patent [19]
Roy

[11] 3,935,630
[45] Feb. 3, 1976

[54] SHOCK ABSORBER SPRING CHANGING TOOL

[76] Inventor: Richard M. Roy, 31 Old Common Road, Wethersfield, Conn. 06109

[22] Filed: Apr. 28, 1975

[21] Appl. No.: 572,506

[52] U.S. Cl. .................. 29/227; 254/10.5
[51] Int. Cl.² .................. B23P 19/04
[58] Field of Search .................. 29/227, 225, 267; 254/10.5

[56] References Cited

UNITED STATES PATENTS

| | | | |
|---|---|---|---|
| 1,429,024 | 9/1922 | Douglass | 254/10.5 |
| 2,883,742 | 4/1959 | Prath | 254/10.5 |
| 3,814,382 | 6/1974 | Castoe | 29/227 |

*Primary Examiner*—James L. Jones, Jr.
*Attorney, Agent, or Firm*—Russell M. Lipes, Jr.

[57] ABSTRACT

A tool permitting the changing or replacing of a shock absorber helical spring, the tool including a base on which a shock absorber is mounted in a position parallel to the base with one end of the shock absorber being restrained, a shock absorber length adjustment shaft is positioned on the base adjacent the other end of the shock absorber, a hand lever is positioned on the adjustment shaft with strategically located pins on the hand lever being inserted between coils of the spring, and the hand lever is then moveable to cause compression of the spring sufficiently far to enable removal of a spring retainer and thus removal of the spring.

16 Claims, 4 Drawing Figures

SHOCK ABSORBER SPRING CHANGING TOOL

BACKGROUND OF THE INVENTION

1. Field of the Invention

This invention relates to apparatus to be used for removing and replacing a preloaded helical coil spring which is part of a shock absorber, and more particularly to apparatus for readily compressing the spring.

2. Description of the Prior Art

Shock absorbers of the type characteristically used on motorcycles employ a hydraulic cylinder surrounded at least for a portion of its length by a coil spring maintained in a compressed state between a pair of keepers. One of the keepers is integral with the outer casing of the hydraulic cylinder and the other keeper is removably located on or affixed to the piston rod extending from the hydraulic cylinder. The removability of the keeper permits facile changing of the coil spring to thus alter the characteristics of the shock absorber depending on the spring rate.

In motorcycle racing, it is desired to frequently and rapidly change a shock absorber spring in repairing or rebuilding a shock absorber or to change load ratings on a shock absorber to adjust to or accommodate race course surface variations. Usually these changes must be made quickly, between racing heats and not always under ideal working conditions. The combined efforts of several persons is needed to compress the coil spring and remove the keeper, and then, after a replacement spring has been installed, to compress the spring and reassemble the keeper. There exists a need for a simple, easily handled apparatus to enable one person under stressful, somewhat improvised conditions to quickly and handily change a shock absorber spring.

In the prior art, Smyser U.S. Pat. No. 3,278,157 discloses a type of shock absorber spring compressor which requires the installation and then the removal of a lock bolt and nut through the spring. Castoe U.S. Pat. No. 3,814,382 discloses a type of spring compressor which requires a yoke pusher plate and cooperating bracket as well as a power source. Neither patent teaches a shock absorber remover which has the versatility and relative simplicity of operation or affords the speedy removal of a spring as provided by this invention.

SUMMARY OF THE INVENTION

An object of the present invention is to provide an improved shock absorber spring changing tool.

Another object of the invention is to provide a tool for changing a shock absorber spring which has versatility of use and can be readily used even under relatively primative working conditions.

Still another object of the invention is to provide a tool for changing a shock absorber coil spring which is relatively simple in construction and operation and does not require an auxiliary force or pressure beyond a low level of human strength for operation, and which can be used by a single person.

The foregoing and other objects, features and advantages of the invention become more apparent in the light of the following detailed description of a preferred embodiment thereof, as illustrated in the accompanying drawing.

DESCRIPTION OF A PREFERRED EMBODIMENT

Figure 1:
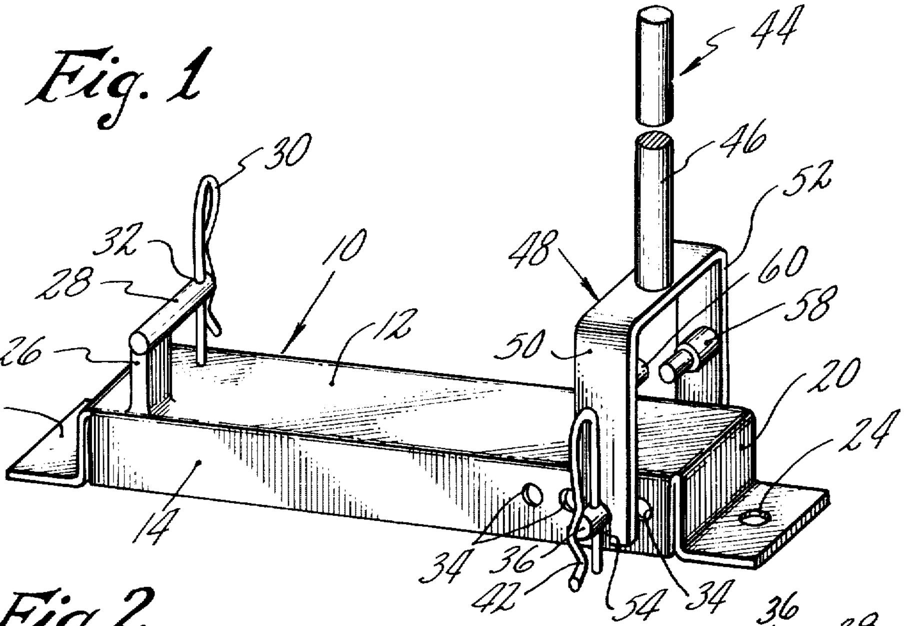
FIG. 1 is a side perspective view of the tool of this invention with the various elements in place.

Referring to FIG. 1, base 10 is shown which may be made from sheet stock. The base has a flat face 12 and sides 14 and 16 (FIG. 3) which are bent down at right angles to the face, and ends 18 and 20 which are bent into L-shape as shown to complete a box-like structure. End 18 has hole 22 (FIG. 2) therein and end 20 has hole 24 therein which can be used for permanently mounting the base to a wall or workbench. Alternately, the base can merely be placed loosely on any flat surface or it may be held in a vise.

Figure 2:
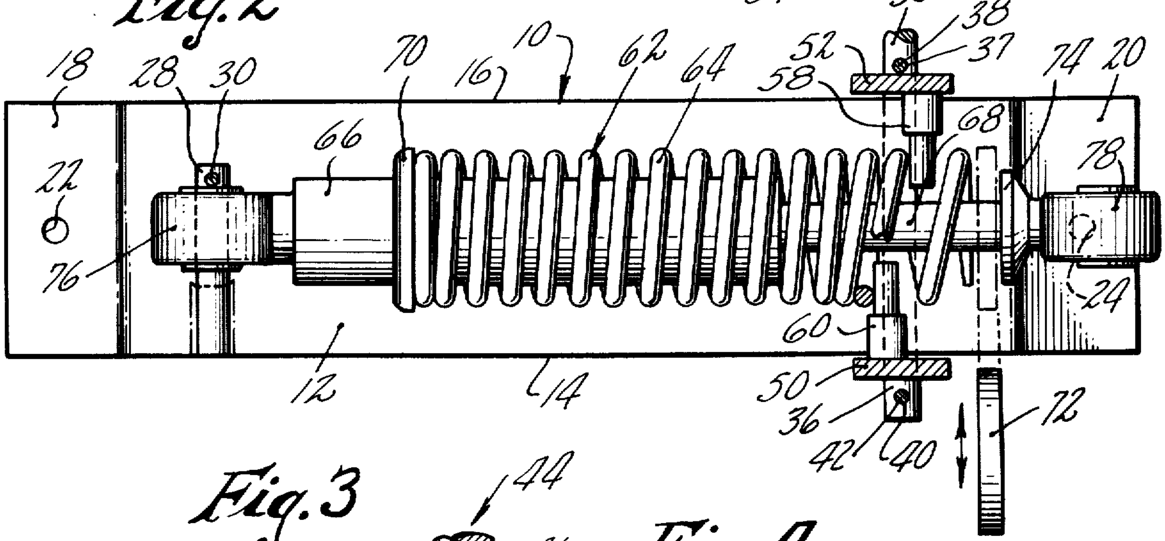
FIG. 2 is a top elevation, partially in section, of the tool showing a shock absorber in position on the tool and the spring compressed sufficiently far to permit removal of a washer-type spring retainer.
Figure 3:
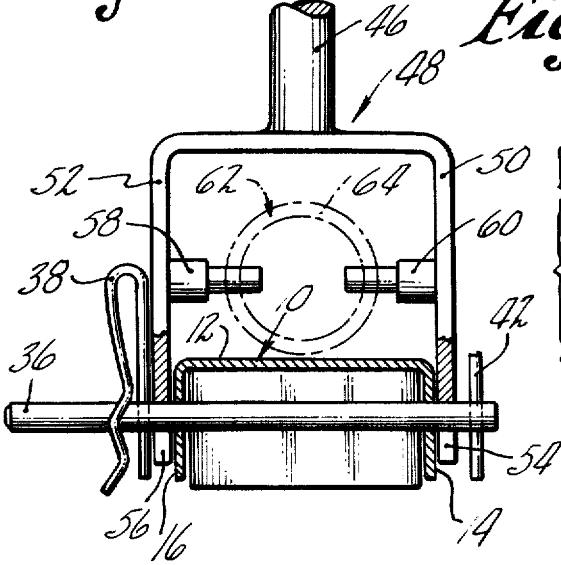
FIG. 3 is an end view, looking toward the right of FIG. 2, being partially in section through the base of the tool.

Adjacent one end of the base, the left end in FIG. 1, support block 26 is welded to the base and locating pin 28 is welded to the support block. U-shaped safety pin 30 is adapted to be inserted through hole 32 near the outer end of the locating pin. A plurality of pairs of holes 34 are pierced through sides 14 and 16 adjacent the other end of the base. These holes are for receiving shaft 36 which is adjustably positionable dependent upon the length of the shock absorber being serviced and which serves as a pivot for a hand lever as will be explained. As best seen in FIGS. 2 and 3, shaft 36 has hole 37 therethrough near one end for receiving U-shaped safety pin 38 and the other end has hole 40 therethrough for receiving U-shaped safety pin 42. The end of the shaft adjacent safety pin 42 is sufficiently long to provide for easy grasping of the shaft.

Spring depressor hand lever 44 includes handle 46 connected to U-shaped claw 48. The claw is sufficiently wide to straddle base 10 and opposing projections 50 and 52 on the claw have slots in their lower end, only slot 54 in the end of projection 50 being clearly visible in FIG. 1, which are shaped to fit over and receive shaft 36, and to be pivotable thereabout. Part of slot 56 on projection 52 can be seen in FIG. 3.

A pair of spring depressor pins 58 and 60 are located within projections 50 and 52, respectively, on claw 48. The diameter of the pins may be stepped as shown. The centerline of the pins, as can be seen in FIG. 3, is a finite distance above shaft 36 and essentially on the centerline of a typical shock absorber when placed in position on base 10; their ends are sufficiently spaced apart a distance greater than a shock absorber piston rod; and they are staggered a finite distance along the length of a shock absorber spring so as to readily go between the coils of either a right or left hand coil spring. Characteristically these springs are spiral wound as either right or left hand helixes and vary in wire guage and the number of coils per unit length.

Shock absorber 62 is shown in position on base 10 in FIG. 2. The shock absorber includes coil spring 64 surrounding cylinder 66 and piston rod 68. The spring is restrained at one end by fixed keeper 70 which is integral with cylinder 66 and removable keeper 72, a slotted washer, which is retained in place by the force of the spring against shoulder 74 integral with piston rod 68. The diameter of the shoulder is less than the inner diameter of the coil spring so that a spring can be removed or installed in place. Shock absorber eye 76 is integral with cylinder 66 and is at one end of the shock abosrber, the left end here, and eye 78 is integral with piston rod 68 at the other end of the shock absorber.

Figure 4:
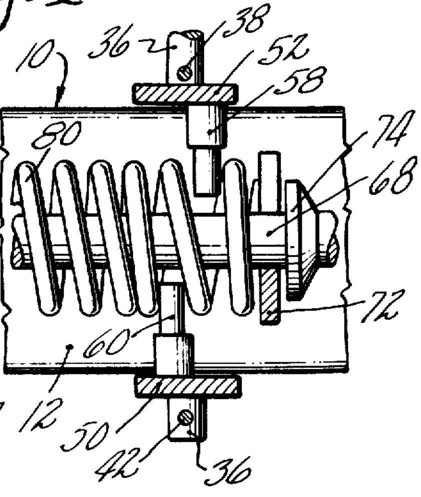
FIG. 4 is a partial section of a tool and shock absorber as in FIG. 2, the shock absorber having a spring wound reversely to that of FIG. 2.

In the showing of FIG. 4, coil spring 80 on a shock absorber similar to that of FIG. 2 is wound in a direction opposite to that of FIG. 2. The figure shows pins 58 and 60 on hand lever 44 between the coils.

To change a coil spring, eye 76 of shock sbsorber 62 is placed over locating pin 28 on the tool and secured in place by safety pin 30 to prevent the shock absorber from slipping off the pin. Shaft 36 is then placed in one of the pair of holes 34 close to removable keeper 72 and secured by safety pins 38 and 42. Hand lever 44 then is placed in position by slipping projections 50 and 52 over shaft 36 as spring depressor pins 58 and 60 are inserted between the coils of the spring. The handle lever is then rotated toward eye 76 sufficiently far to move the spring away from removable keeper 72, compressing the spring toward fixed keeper 70. As shown in FIG. 2, removable keeper 72, which is slotted, then can be taken off piston rod 68 by finger or other action. Reverse motion on the hand lever and removal of it from shaft 36 and the spring then permits the spring to be removed from the shock absorber. In some shock absorber constructions, the removable keeper is integral with the eye and they are screwed to the piston rod. Use of the hand lever in such constructions relieves spring loading so that the keeper and eye portion can be unscrewed and the spring then removed.

To reassemble a shock absorber, the shock absorber is placed in position on the base and the hand lever is used to compress the spring so that the removable keeper can either be slid or screwed into position.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A tool for changing the helical coil spring of a shock absorber, said shock absorber having a removable keeper at one end and a nonremovable keeper at the other end retaining the coil spring, the tool comprising a base of generally rectangular plan form, means adjacent one end of the base for anchoring the nonremovable keeper end of the shock absorber when placed on said base, means adjacent the other end of and in the base for positioning shaft means proximate to said removable keeper, lever means adapted to be positioned over said shaft means and to be pivotable thereabout, and means integral with said lever means for compressing said coil spring as said lever means is rotated about said shaft so as to permit removal of said removable keeper and removal of said spring from said shock absorber.

2. A tool in accordance with claim 1 in which the means for compressing the coil spring is a pair of pins which are inserted between coils of the coil spring when the lever means is positioned over the shaft.

3. A tool in accordance with claim 2 in which the coil spring compressor pins are located on a line above the shaft approximately coincident with the shock absorber center line.

4. A tool in accordance with claim 2 in which the coil spring compressor pins are located so as to be staggered along the length of the coil spring so as to fit conveniently between coils of the spring.

5. A tool in accordance with claim 2 in which the pins are located on a common line approximately on the center line of the shock absorber when in position on the base and displaced with respect to each other along the length of the shock absorber.

6. A tool in accordance with claim 2 in which the base has ends with holes therein for securing the base to a fixed surface.

7. A tool in accordance with claim 1 having safety pin means useable with said anchoring means to retain said shock absorber in place on said base and with said shaft means to retain it in place in said base.

8. A tool in accordance with claim 1 in which there are a plurality of means in the base for positioning the shaft means so as to accommodate shock absorbers of different lengths.

9. A tool in accordance with claim 1 in which the lever means includes a handle and a U-shaped claw having slotted projections fitting over the shaft means.

10. A tool in accordance with claim 9 in which a pin projects from each projection toward the other pin.

11. A tool assembly to be used to change the helical coil spring of a shock absorber, the tool including a base having side elements and end elements forming a box-like structure, supporting means on said base adjacent one end, said supporting means including means for anchoring one end of a shock absorber and means for retaining said shock absorber in place, a plurality of sets of holes in said side elements at different distances from said supporting means, shaft means adaptable to be positioned in one set of said sets of side element holes and having portions extending outward from said side elements, means for retaining said shaft in a set of holes, and lever means positionable on the outward extending portions of said shaft means, said lever means having means thereon for compressing the helical coil spring of a shock absorber.

12. A tool assembly in accordance with claim 11 in which there are holes in the end elements of said base for the attachment of the base to a fixed surface.

13. A tool assembly in accordance with claim 11 in which the lever means has a claw-like portion which surrounds a shock absorber lying on said base with one end connected to said supporting means.

14. A tool assembly in accordance with claim 13 in which the claw-like portion has spring depressing means for fitting between coils of said spring.

15. A tool assembly in accordance with claim 14 in which the spring depressing means are pins extending toward each other from the interior of the claw-like portion and staggered along the coil spring.

16. A tool assembly in accordance with claim 11 in which the retaining means on said supporting means and said shaft means are U-shaped safety pins.

* * * * *